No. 801,337. PATENTED OCT. 10, 1905.
M. REID.
APPARATUS FOR FORMING IRREGULAR SURFACES ON CYLINDRICAL BODIES.
APPLICATION FILED APR. 14, 1903. RENEWED JAN. 18, 1904.

3 SHEETS—SHEET 1.

Witnesses:
A. D. Harmon
L. E. Kennedy

Inventor:
Marcellus Reid
by Knight Brothers
Attys.

No. 801,337. PATENTED OCT. 10, 1905.
M. REID.
APPARATUS FOR FORMING IRREGULAR SURFACES ON CYLINDRICAL BODIES.
APPLICATION FILED APR. 14, 1903. RENEWED JAN. 18, 1904.

No. 801,337. PATENTED OCT. 10, 1905.
M. REID.
APPARATUS FOR FORMING IRREGULAR SURFACES ON CYLINDRICAL BODIES.
APPLICATION FILED APR. 14, 1903. RENEWED JAN. 18, 1904.
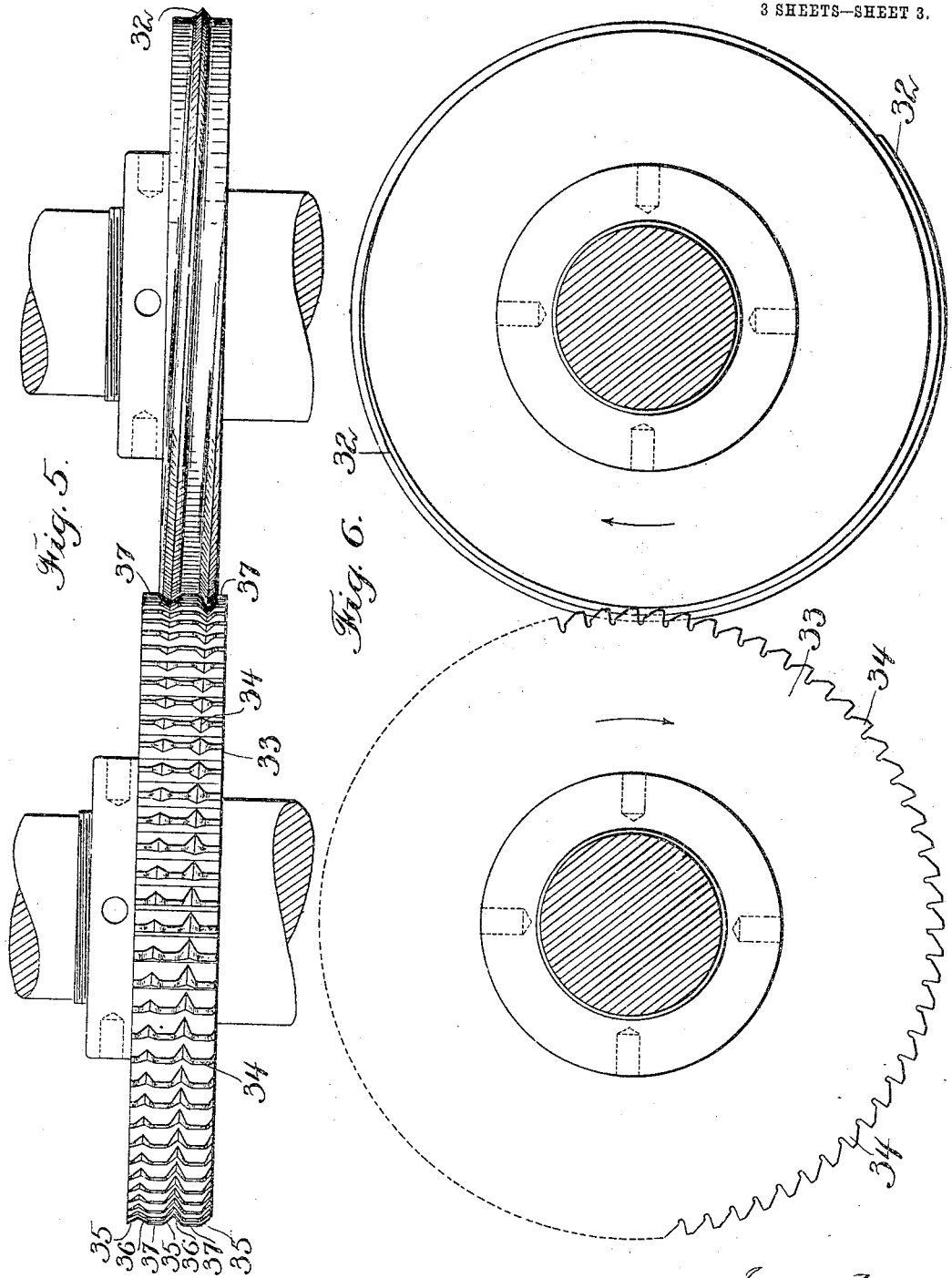

UNITED STATES PATENT OFFICE.

MARCELLUS REID, OF PROVIDENCE, RHODE ISLAND, ASSIGNOR TO AMERICAN BALL COMPANY, OF PROVIDENCE, RHODE ISLAND, A CORPORATION OF RHODE ISLAND.

APPARATUS FOR FORMING IRREGULAR SURFACES ON CYLINDRICAL BODIES.

No. 801,337.        Specification of Letters Patent.        Patented Oct. 10, 1905.

Application filed April 14, 1903. Renewed January 18, 1904. Serial No. 189,634.

*To all whom it may concern:*

Be it known that I, MARCELLUS REID, of Providence, in the county of Providence and State of Rhode Island, have invented certain new and useful Improvements in Apparatus for Forming Irregular Surfaces on Cylindrical Bodies, of which the following is a specification.

This invention has for its object to provide means for quickly and accurately forming irregular surfaces on or in cylindrical bodies, such surfaces being, for example, the sides and bottoms of cam-grooves below or within the perimeter of a cylindrical body or the surfaces of helical or other shaped ridges for cutting or other purposes, said ridges being raised above the periphery of the cylindrical body.

The invention, which may be used for a variety of purposes, consists in the several improvements which I will now proceed to describe and claim.

Figure 1:
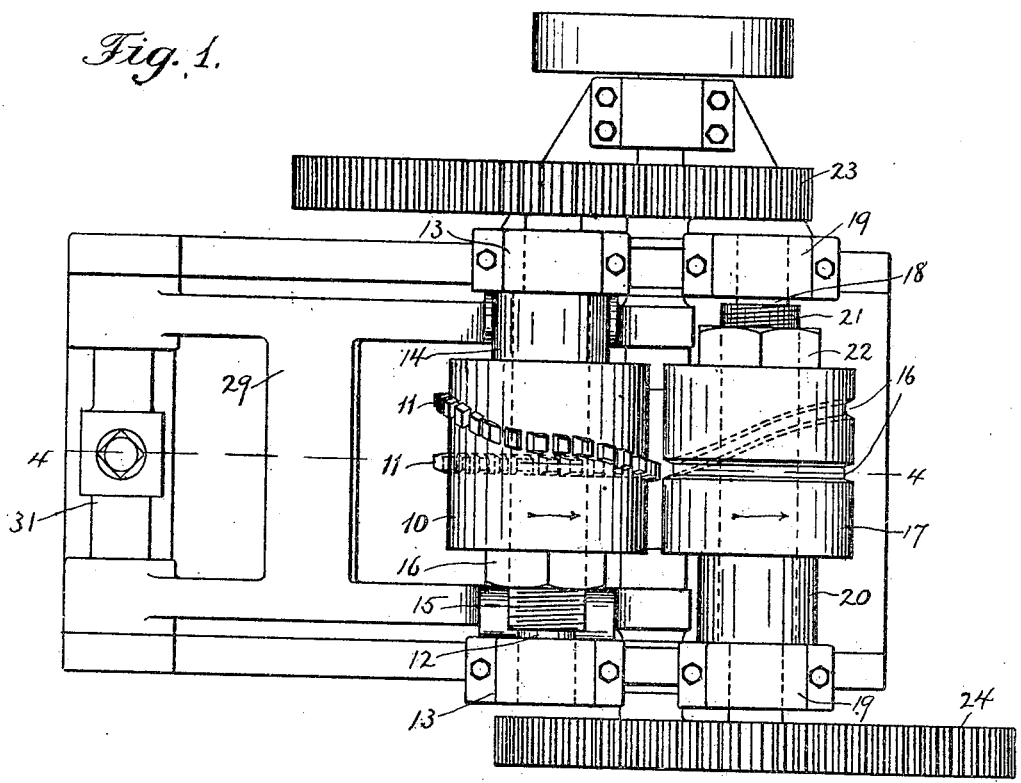
Figure 2:
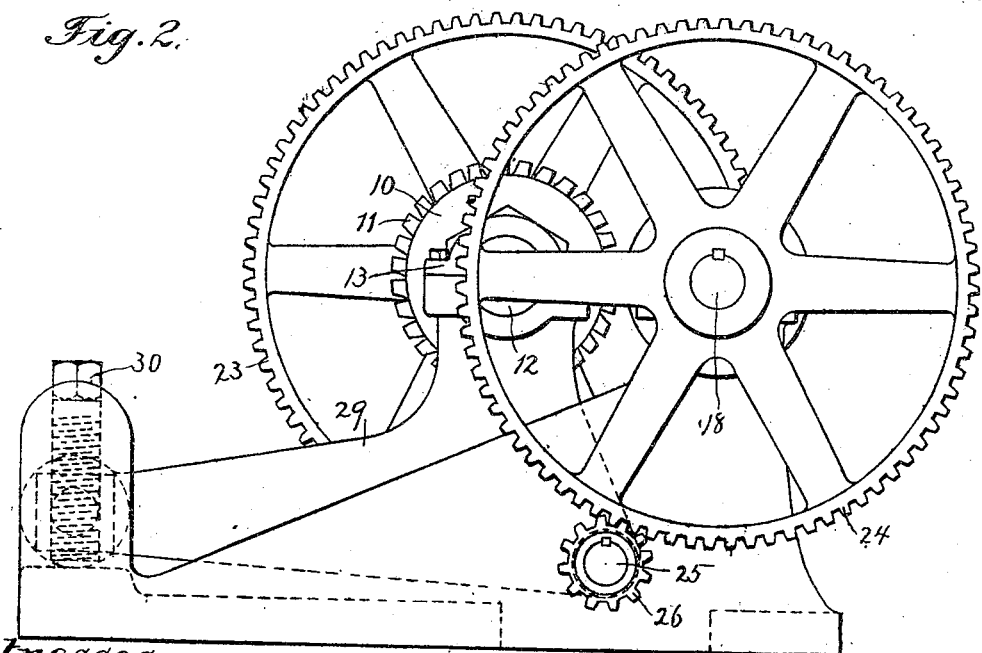
Figure 3:
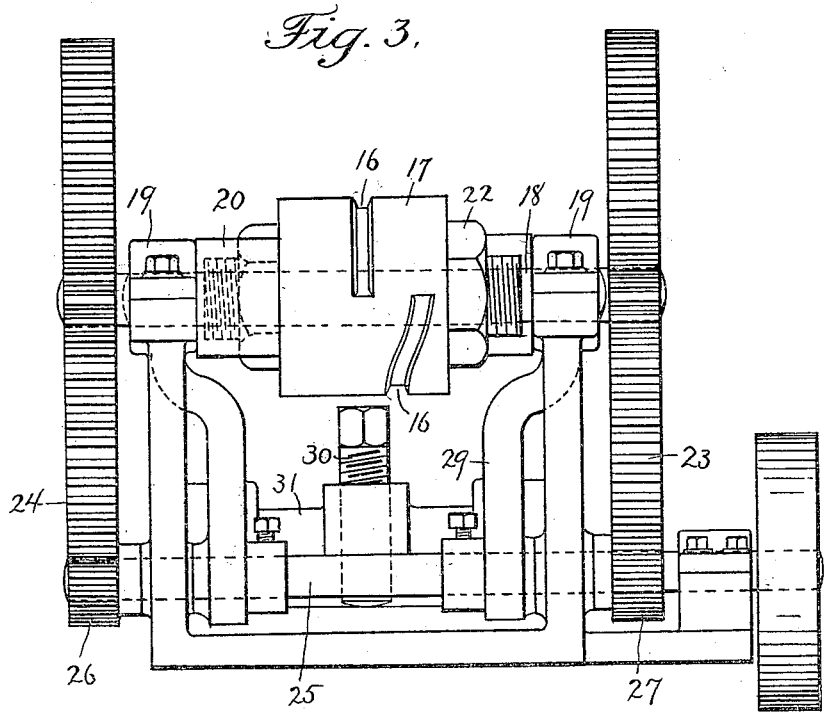
Figure 4:
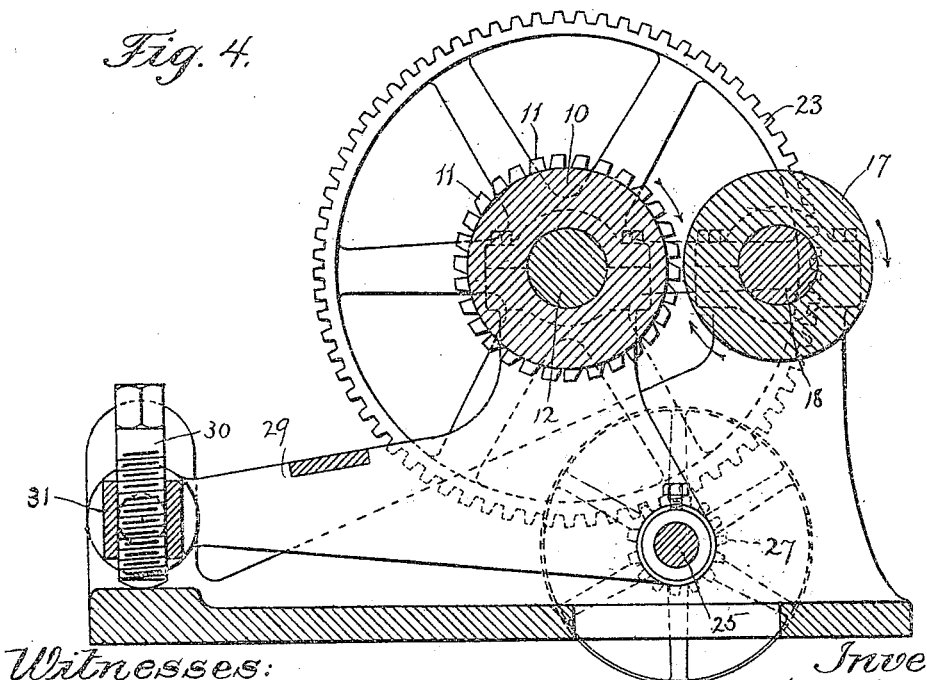

Of the accompanying drawings, forming a part of this specification, Figure 1 represents a top plan view of an apparatus embodying my invention and showing means for forming surfaces sunken within the periphery of a cylindrical body, said figure showing a cylindrical body in which the cam-groove has been cut in accordance with my invention. Fig. 2 represents an end elevation of the apparatus shown in Fig. 1. Fig. 3 represents a side elevation. Fig. 4 represents a section on line 4 4 of Fig. 1. Fig. 5 represents a plan view of a cutting tool or hob and a body finished by the action thereof, said tool being constructed to form an approximately helical rib of gradually-increasing height upon the body, the rib being raised above the periphery of the said body. Fig. 6 represents a side view of the parts shown in Fig. 5.

The same figures of reference indicate the same parts in all of the figures.

In carrying out my invention I provide a rotary cutting tool or hob, which, as shown in Fig. 1, comprises a cylindrical body 10 and a series or row of cutting-teeth 11, irregularly arranged on the periphery of the body 10. The term "irregularly," as used in connection with the construction here shown, is intended to convey the idea that the teeth are arranged in a row which throughout at least a part of its length is helical or oblique to the axis of the body 10. As here shown, the teeth composing a part of the row are at right angles to the axis, while those composing the remaining part of the row are obliquely arranged relatively to the axis. The said tool is affixed to a rotary holder 12, journaled in suitable bearings 13 13, the holder being preferably a shaft having a shoulder 14 and a screw-threaded portion 15, with which is engaged a clamp-nut 16, the rotary tool being clamped between the said shoulder and nut. This construction permits of removal of the tool from the holder and the substitution of a differently-formed tool therefor.

The described tool is caused to cut a cam-groove 16 in a cylindrical blank or body 17 by locating the said tool and blank side by side with their axes substantially parallel and synchronously rotating the tool and blank in the same direction, as indicated by the arrows in Figs. 1 and 4, one of the parts, hereinbefore termed the "tool" and "blank," being moved or fed at suitable intervals to decrease the distance between the axes of the said parts, and thus cause the teeth of the cutting-tool to enter the blank. The result of the synchronous rotation of the tool and blank and of the feed movement above described is the formation of the groove 16 in the blank, said groove corresponding in form to the form and arrangement of the cutting-teeth 11.

In practice the feed movement may take place after each complete rotation of the tool and blank, so that each successive rotation deepens the cut made by the preceding rotation.

The blank 17 is supported by a blank-holder 18, which is preferably a shaft journaled in bearings 19 19, the axis of said blank-holder being parallel with the axis of the rotary holder 12. The blank-holder is provided with a shoulder 20 and with a threaded portion 21, with which is engaged a clamping-nut 22, the blank being detachably held between the said shoulder and nut.

The means for synchronously rotating the tool and blank are in this embodiment of my invention as follows: 23 represents a relatively large gear fixed to one end of the shaft or tool-holder 12. 24 represents a gear of the same size as the gear 23 affixed to the opposite end of the shaft or blank-holder 18. 25 represents a driving-shaft journaled in the supporting-frame and provided with two relatively small driving gears or pinions 26 27, the former meshing with the gear 24 on the blank-holder, and the latter with the gear 23 on the tool-holder.

It will be seen that the rotation of the driving-shaft causes the two holders 12 and 18 to rotate synchronously, owing to the fact that the two driving-gears 26 27 are of uniform diameter, and the two driven gears 23 and 24 are also of uniform diameter.

The feed movement above described is effected in this embodiment of my invention by making the tool-holder movable toward and from the blank-holder, the tool-holder bearings 13 13 being mounted in an oscillatory frame 29, which is hung on the driving-shaft 25 and has the latter for its center of oscillation. The outer end of the frame 29 is provided with an adjusting-screw 30, which bears upon a seat or step on the base of the supporting-frame, said screw being engaged with a tapped orifice in a cross-bar 31, which is journaled in bearings in the frame 29. When the screw is turned downwardly, it raises the outer end of the frame 29 and imparts a lateral movement to the tool-holder in the direction of the blank-holder.

It will be seen by reference to Figs. 2 and 4 that the relative arrangement of the parts is such that the described movements of the frame 29 do not affect the operative relation of the driving-gears 26 26 to the driven gears 23 and 24. In Figs. 5 and 6 I show a rotary cutter adapted to remove portions of the periphery of the blank in such manner as to leave thereon a sharp-edged helical rib 32, said rib progressively increasing in height from one end to the other. In this embodiment of my invention the cutter is composed of a body 33, having teeth 34, the cutting edges of which are provided with oppositely-inclined portions 35 36 and parallel portions 37. The inclined portions are arranged in a helical row or series, and they increase in length from one end of the series to the other, their form being such as to give the sides of the rib 32 the desired shape, while the portions 37 shape the perimeter from which the rib projects. The article thus formed is intended for use as one member of a pair of dies adapted to cut a rod of metal into short lengths or slugs, the two members being arranged to act simultaneously on the rod, the ribs 32 of said members acting conjointly to form grooves of gradually-increasing depth in the rod when the two members are rotated simultaneously in opposite directions. It is obvious that the operation of the cutter 33 is the same as that of the cutter 10, hereinbefore described, the said cutter 33 being secured to the tool-holder and rotated synchronously with the blank, which is secured to the blank-holder in the manner above described.

Having thus explained the nature of my invention and described a way of constructing and using the same, although without having attempted to set forth all the forms in which it may be embodied or all the modes of its use, I declare that what I claim is—

1. An apparatus of the character stated, comprising a rotary cutting tool or hob having obliquely-arranged teeth, means for supporting a cylindrical blank with its axis substantially parallel with the axis of the tool, and means for synchronously rotating said tool and blank.

2. An apparatus of the character stated, comprising a rotary cutting tool or hob having obliquely-arranged teeth, a rotary work-holder having its axis substantially parallel with the axis of the tool and provided with means for holding a cylindrical blank, means for synchronously rotating the tool and work holder, and means for moving one of said parts laterally.

3. An apparatus of the character stated, having as elements, first, a rotary tool-holder provided with means for holding a rotary cutting tool or hob having obliquely-arranged teeth; and secondly, a rotary blank-holder having its axis substantially parallel with the axis of the tool-holder and provided with means for detachably engaging or clamping a cylindrical blank, said apparatus having also movable bearings for one of said elements, means for adjusting said bearings, whereby the element supported by said bearings may be moved to vary the distance between the axes of the two elements, and means for synchronously rotating the said elements.

4. An apparatus of the character stated, comprising a rotary tool-holder adapted to hold a cutting tool or hob, a rotary blank-holder adapted to hold a cylindrical blank, the axes of the said holders being substantially parallel, relatively large gears of equal diameter affixed to the said holders, and a driving-shaft having two relatively small driving gears or pinions of equal diameter, one of said driving-gears meshing with the gear on the tool-holder, and the other with the gear on the blank-holder.

5. An apparatus of the character stated, comprising a rotary tool-holder adapted to hold a cutting-tool, a rotary blank-holder adapted to hold a cylindrical blank, the axes of said holders being substantially parallel, movable bearings supporting said tool-holder, means for adjusting said bearings to vary the distance between its axis and the axis of the blank-holder, relatively large gears of equal diameter affixed to the said holders, and a driving-shaft having two relatively small driving gears or pinions of equal diameter, one of said driving-gears meshing with the gear on the tool-holder and the other with the gear on the blank-holder.

6. A rotary cutting tool or hob having teeth with straight and inclined cutting portions the latter being arranged in a helical row or series, said inclined sides gradually increasing in length from one end of the series to the other.

In testimony whereof I have affixed my signature in presence of two witnesses.

MARCELLUS REID.

Witnesses:
W. T. EYER,
ALBERT T. SISSON.